Oct. 7, 1958 G. R. TOLAND 2,855,240
TRAILER WITH TELESCOPIC FLOOR PORTION
Filed April 14, 1955

INVENTOR
Glenn R. Toland
BY
Mason, Fenwick & Lawrence
ATTORNEYS

United States Patent Office 2,855,240
Patented Oct. 7, 1958

2,855,240

TRAILER WITH TELESCOPIC FLOOR PORTION

Glenn R. Toland, Dickens, Iowa

Application April 14, 1955, Serial No. 501,303

2 Claims. (Cl. 296—23)

This invention relates to vehicles, and particularly to vehicles such as trailers having an extremely low overall height. This application is a continuation-in-part of copending application Serial No. 417,791, filed March 22, 1954, now abandoned.

It has long been desirable to reduce the height of trailers to cut down on wind resistance, make them easier to pull, and more in keeping with the lower styling of the modern automobile. This has been difficult, however, due to the necessity for ample road clearance while moving on the highway, and ample headroom inside when stationary.

One object of the present invention is to provide a trailer having a movable floor, or floor portion, which permits it to be lowered when the trailer is parked to allow required headroom within, and raised when the vehicle is to be moved so that full road clearance will be had.

Another object of the invention is the provision of such a trailer in which the movable floor section is encompassed by telescoping sections to maintain an enclosure at all positions of adjustment of the floor without interfering with the internal arrangement of the trailer.

A further object is the provision of a trailer of this type having means for positioning and holding the floor at any point within its extreme limits.

Yet another object is to provide in structure of this type means to hold the several sections of the enclosing wall against objectionable rattling when raised and the vehicle is in motion.

A still further object is to provide a trailer of low height, streamlined for minimum wind resistance and beauty and arranged to provide maximum room inside.

It is another object to provide a trailer having relatively low road clearance which will not drag at the rear when encountering sudden inclines or dips in the roadway as in crossing gutters, entering driveways, etc.

Other objects of the invention will become apparent from the following description of a practical embodiment thereof when taken in conjunction with the drawings which accompany, and form part of, this specification.

Figure 1:
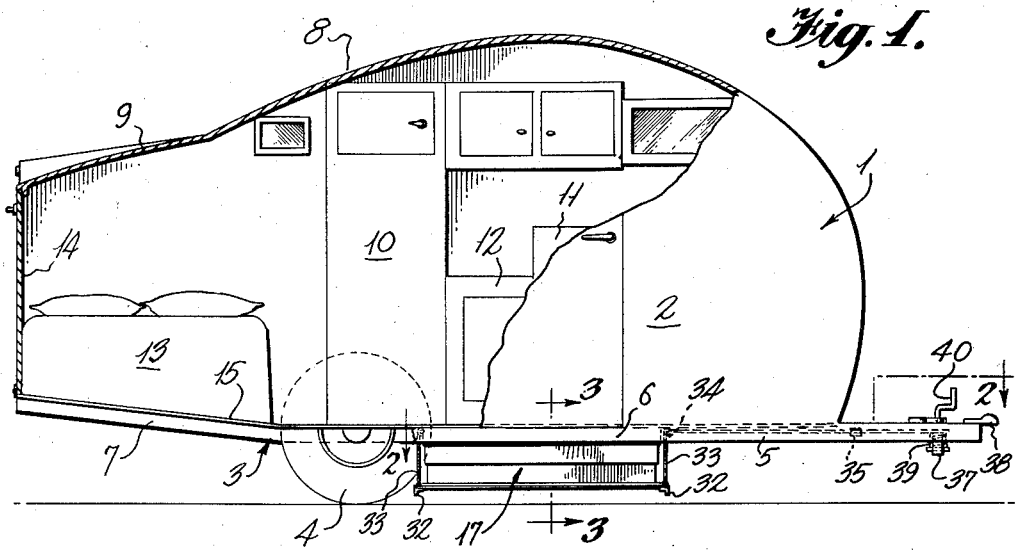
Figure 1 is a side view of a trailer embodying the principles of the present invention.
Figure 2:
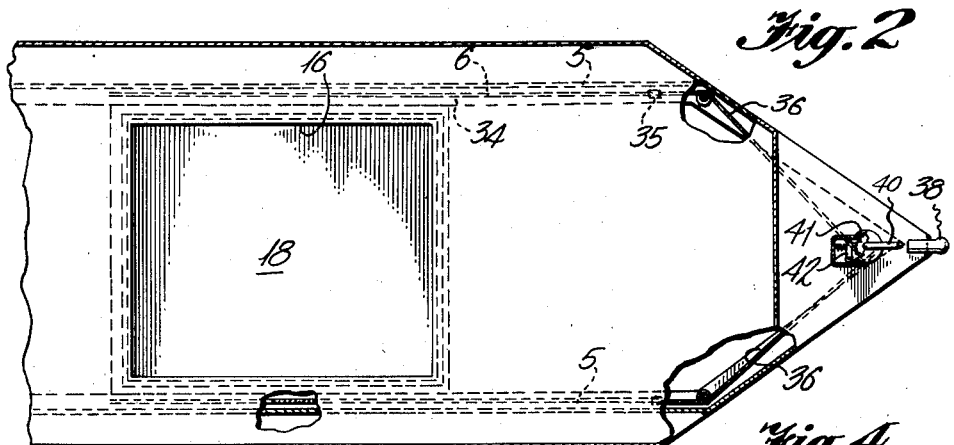
Figure 2 is a horizontal section through the trailer and is taken substantially on the line 2—2 of Figure 1.
Figure 3:
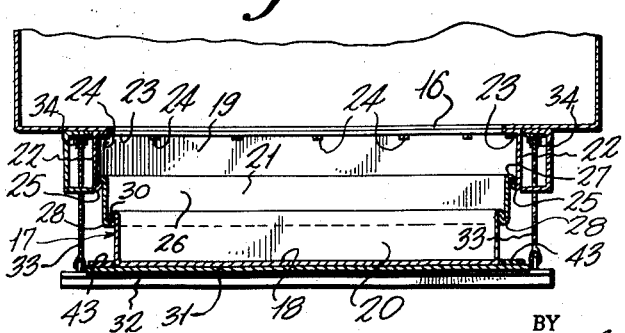
Figure 3 is a transverse, vertical section taken on the line 3—3 of Figure 1.
Figure 4:
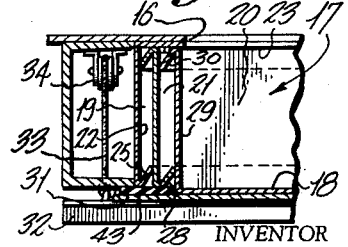
Figure 4 is a detailed view through one side of the trailer frame and floor showing the floor in raised position.

Referring to the drawings in detail, there is shown a trailer 1. Although a house trailer has been shown and the invention will be described with reference to one, it will be understood that the invention is applicable to other vehicles whether they be towed vehicles or self propelled.

The trailer has a body 2, mounted on a chassis 3 supported upon the usual rubber tired wheels 4. The chassis frame is formed of spaced side channel members 5 and is low-slung with respect to the wheels. When the trailer is attached to a towing vehicle, or jacked for temporary camping, that portion of the frame forward of the wheels, 6 will lie substantially parallel to the ground and will be only high enough from the ground to provide normal road clearance. Usable floor space within the trailer will be confined to this area. From the wheels rearward, the frame includes upwardly, as at 7, to provide additional clearance. This permits the vehicle to be tilted sharply without the rear end dragging.

The top of the body is arcuate, as at 8, over the major portion of the vehicle and terminates in a sloping rear deck 9. The height of the body from the chassis to the peak of the top is less than the height of an average adult. In the region of the deck 9, this height is drastically reduced. In the higher portions of the vehicle, necessary equipment such as refrigerator 10, sink 11, stove 12, cabinets, etc., may be arranged about the floor space. A bed 13 may be conveniently installed in the low rear section. A door 14 may be hinged at the back so that it may be opened for ventilating purposes.

In order to obtain adequate headroom in the area of usable floor space, that part of the floor, or a portion thereof, is made vertically movable so that it can be lowered when the trailer is parked and raised when the vehicle is to be moved. The main floor 15 is cut away to form an opening 16 of desired size and shape and an expansible and contractible housing 17 is mounted beneath the trailer floor and carries the movable floor 18. The housing is composed of a plurality of telescoping members which include an upper member 19 secured to the underside of the trailer floor, a bottom member 20 which carries the movable floor 18, and one or more intermediate members 21.

The top member 19 is a rectangular enclosure having vertical walls 22 spaced apart a somewhat greater distance than the sides of the opening 16 in the trailer floor. A horizontal securing flange 23 projects inwardly from the tops of the walls, and extends around the entire periphery of the enclosure. Bolts, rivets, or other fastening means 24 secure the flange to the trailer floor. This positions the top member symmetrically about the opening 16. The material forming the walls is bent inwardly and upwardly at the bottom to form a positioning and locking flange 25 for the subjacent member 21.

The intermediate member 21 also has vertical walls 26, but these walls are not quite so widely spaced as those of the top member. The width of the intermediate member will be such that its walls will slide freely within the bottom flange 25 of the top member. This arrangement, while permitting free vertical movement of the intermediate section, will hold that section centered with respect to the top section. The intermediate member walls are turned downwardly and inwardly at the top to form a flange 27 which helps to keep the member centered in all positions of adjustment and interlocks with the flange 25 when the intermediate member is lowered to its full extent. At the bottom of member 21 there is an inwardly and upwardly turned flange 28 similar to flange 25 of the member 19.

The bottom member 20 has walls 29 which slide within the flange 28. A flange 30 is provided at the top of member 20 to interlock with flange 28. The floor 18 is secured to, or is integral with, the walls 29 and is larger than the housing members providing an outstanding extending ledge 31 around the bottom member. Floor 18 is braced and stiffened by angle irons 32 which extend transversely beneath the floor.

It is highly important that some means be provided to seal the housing around the movable floor to prevent the entrance of dust and dirt while the vehicle is in motion and to reduce rattle and noise due to the floating housing members. This can be done simply by providing a sealing gasket 43 of rubber or similar material, on the ledge 31. The gasket may be sufficiently broad to engage the channel members of the frame to keep out dust and press against the underside of the top and intermediate members to cushion them when raised.

In order to control the movement and position of the movable floor, raising and lowering mechanism is provided. The angle irons 32 are extended beyond the ledge 31 to provide anchoring means for lifting cables 33. The anchoring cables are separate and each passes around a pulley 34 mounted on the chassis channels 5 and lead forward. The separate cables on each side of the frame are joined together, as at 35, and single, heavier cables 36 extend from the juncture to a winch 37. The winch may be mounted at any suitable place, such as on the frame near the trailer hitch 38. The winch can be of any desired type and is shown as having a drum 39 and crank 40. A ratchet 41, on the drum shaft, and a pawl 42 cooperate to hold the drum stationary and thus support the floor in any position. Normally, when the floor is lowered, it will be lowered fully and all strain will be taken by the interlocking housing members.

It will be apparent that by providing a movable floor section centrally of the vehicle and grouping the necessary appliances around it with the bed at the rear, the overall height of the vehicle can be greatly reduced, and the trailer streamlined in a manner not possible with prior vehicles.

While in the above one practical embodiment of the invention has been disclosed, it will be understood that the details of construction shown and described are merely for purposes of illustration and the invention may take other forms within the scope of the appended claims.

What is claimed is:

1. In a vehicle, a frame consisting of a pair of spaced members, a body including a floor having an opening therein within the space between the frame members, a telescoping housing below and about the opening having top, bottom and at least one intermediate member, said members comprising nesting wall frames, said top member having a top horizontal inwardly projecting peripheral flange to engage and be fastened to the underside of the floor about the opening, said top member having an inwardly and upwardly directed peripheral flange at its bottom to engage the wall of the inner member which fits within the top member, said intermediate member having a similar outwardly and downwardly directed annular flange at its top to engage the wall of the top member and to interlock with the bottom flange of the top member when the members are extended, and an inwardly and upwardly directed peripheral flange on the bottom of the intermediate member to engage the wall of the bottom member which fits within the intermediate member, an outwardly and downwardly directed peripheral flange at the top of the bottom member to engage the wall of the intermediate member and interlock with the bottom flange of the intermediate member when the members are extended, a floor section across the bottom of the bottom member and extending peripherally beyond the walls of the bottom member to form a ledge to underlie the bottoms of the intermediate and top members and said spaced frame members, said bottom and intermediate members having their top edges arranged for contact with the underside of the top horizontal flange of the top member, a resilient gasket upon tthe upper surface of said ledge, and means to raise and lower said bottom section and to hold the bottom section in raised position, whereby the tops of the bottom and intermediate section will be in contact with the top horizontal flange of the top member and said ledge will be in sealing contact with the bottoms of the intermediate and top members.

2. In a vehicle as claimed in claim 1, said means to raise and lower the members comprising, a winch, and cables on said winch having their ends connected to said floor.

References Cited in the file of this patent

UNITED STATES PATENTS

| | | |
|---|---|---|
| 1,260,779 | Koos | Mar. 26, 1918 |
| 1,321,317 | Knol | Nov. 11, 1919 |
| 1,647,210 | Bryans | Nov. 1, 1927 |
| 2,274,754 | Theisan | Mar. 3, 1942 |
| 2,282,914 | Vetterlein | May 12, 1942 |
| 2,569,082 | Wheeler | Sept. 25, 1951 |
| 2,678,442 | Ensor | May 11, 1954 |

FOREIGN PATENTS

| | | |
|---|---|---|
| 539,532 | Germany | Nov. 28, 1931 |
| 147,920 | Sweden | Nov. 30, 1954 |